United States Patent [19]

Kecskemethy et al.

[11] 4,032,040

[45] June 28, 1977

[54] METHOD AND CONTROL SYSTEM FOR BATCHING PLURAL SUBSTANCES AND PUMP SYSTEM

[75] Inventors: Géza Kecskeméthy; Róbert Tihanyi; György Virág, all of Budapest, Hungary

[73] Assignee: Muanyagipari Kutato Intezet, Budapest, Hungary

[22] Filed: Sept. 22, 1975

[21] Appl. No.: 615,661

[30] Foreign Application Priority Data

Sept. 23, 1974 Hungary .......................... MU 529

[52] U.S. Cl. ................................ 222/1; 222/255; 222/309; 222/334; 425/146
[51] Int. Cl.² ...................... B67D 5/08; B67D 5/52
[58] Field of Search .......... 425/145, 146; 222/135, 222/252, 255, 275, 309, 334, 1

[56] References Cited

UNITED STATES PATENTS

| | | | |
|---|---|---|---|
| 2,946,488 | 7/1960 | Kraft | 222/334 X |
| 3,571,856 | 3/1971 | Voelker | 425/145 |
| 3,908,862 | 9/1975 | Chandra et al. | 425/145 X |

Primary Examiner—Robert B. Reeves
Assistant Examiner—David A. Scherbel
Attorney, Agent, or Firm—Young & Thompson

[57] ABSTRACT

In a batcher plant at least one pair of reciprocable pressure cylinders are provided one of which as a first pressure cylinder is connected to a source of pressure medium while the other one as a further pressure cylinder is supplied with pressure medium in dependence on the number of strokes per minute of the first pressure cylinder. Both pressure cylinders drive delivery pumps. The total amount of delivered material is controlled by the speed and the number of cycles of the piston of the first pressure cylinder while the mutual proportions of delivered material are controlled by varying the length of stroke of the further pressure cylinder. Thus, on the one hand, mutual proportions of delivered substances can be finely adjusted within very wide limits and, on the other hand, the pressure cylinders of the various batcher units may be located in considerable distances from one another so that the plant is suitable to perform the most various functions.

8 Claims, 4 Drawing Figures

METHOD AND CONTROL SYSTEM FOR BATCHING PLURAL SUBSTANCES AND PUMP SYSTEM

This invention relates to a method of and a plant for batching at least two substances and more particularly synthetic resins and other materials such as catalysts and accelerants in preselected and adjustable amounts and proportions.

A known method of batching synthetic resins and additions such as catalysts and accelerants consists in delivering both by means of piston pumps mutually connected by mechanical lever transmissions which permit to control the proportions of the various delivered materials. However, such mechanical coupling of individual delivery pumps sets a limit to the number of substances which may simultaneously be batched since, otherwise, the structure of the plant would be too extensive and its operation too cumbersome. Moreover, the range of selectable proportions is restricted as well since a lever transmission obviously does not permit extreme adjustments. A further deficiency consists in that a mechanical connection of delivery pumps requires a close arrangement thereof which is in many cases unfavourable with regard to operational conditions and explosion danger. Also the pressure in a delivery pump may occasionally reach a multiple of the permitted value and amount to several hundred atmospheres if the pump stops working which means that the plant may severely be damaged. High space requirement, cumbersome structure and operation in connection with difficulties of maintenance etc. are likewise liable to prevent an extended employment of batching devices with mechanical lever transmissions.

The main object of the present invention is to obviate the aforesaid deficiencies.

The invention aims at the provision of a batcher plant by means of which an optional number of substances may be delivered and optional proportions may be preselected without the necessity of a close arrangement of individual delivery pumps and without the danger of unduly high pressure increases. Small space requirement, simple structure and reliable operation should be obtained without cumbersome mechanical connections.

The basic idea of the invention is to batch substances, and more particularly synthetic resins and additions by individual batchers operated by reciprocable pressure cylinders which are mechanically independent of and pneumatically or hydraulically coupled with one another by means of a pressure medium, It has been ascertained that with such arrangement the total amount of delivered material can be varied by altering the stroke speed or the number of stroke cycles in one of the pressure cylinders while mutual proportions of the various delivered substances may be varied by altering the stroke lengths in the other pressure cylinders if the latter operate dependent on the number of cycles of the former.

Thus, the invention is, in the first place, concerned with a method of batching at least two substances, more particularly synthetic resins and additions such as catalysts and accelerants in preselected and adjustable amounts and proportions with which each substance is delivered by individual batchers. In such method the invention suggests to employ the steps of driving said batchers by means of reciprocable pressure cylinders, selecting a first pressure cylinder for being supplied with a pressure medium from a source of such medium, feeding further pressure cylinders with a pressure medium dependent on the number of strokes per minute of said first pressure cylinder, controlling the total amount of discharge of the batchers by varying the number of strokes per minute of said first pressure cylinder, and controlling the mutual proportions of delivered substances by varying the stroke lengths of said further pressure cylinders.

The method according to the invention will preferably be carried out by a batcher plant having a first reciprocable pressure cylinder and at least one further reciprocable pressure cylinder arranged for driving said batchers, a pressure medium reverser associated with and arranged upstream of said first pressure cylinder, at least one work chamber of said further pressure cylinder being in operational connection with one of the work chambers of said first pressure cylinder, first control means for altering the number of strokes per minute of said first pressure cylinder, and second control means for altering the stroke lengths of said further pressure cylinder. The pressure cylinders may be of the single-acting type and may e.g. be provided with retracting springs. Double-acting pressure cylinders, however, ensure a smoother operation, are of simpler structure and, thus, more reliable in operation.

The invention will hereinafter be described in closer details by taking reference to the accompanying drawing which shows, by way of example, various embodiments of the batcher plant in compliance with the present invention and in which.

Same reference characters in the drawing designate similar details.

Figure 1:
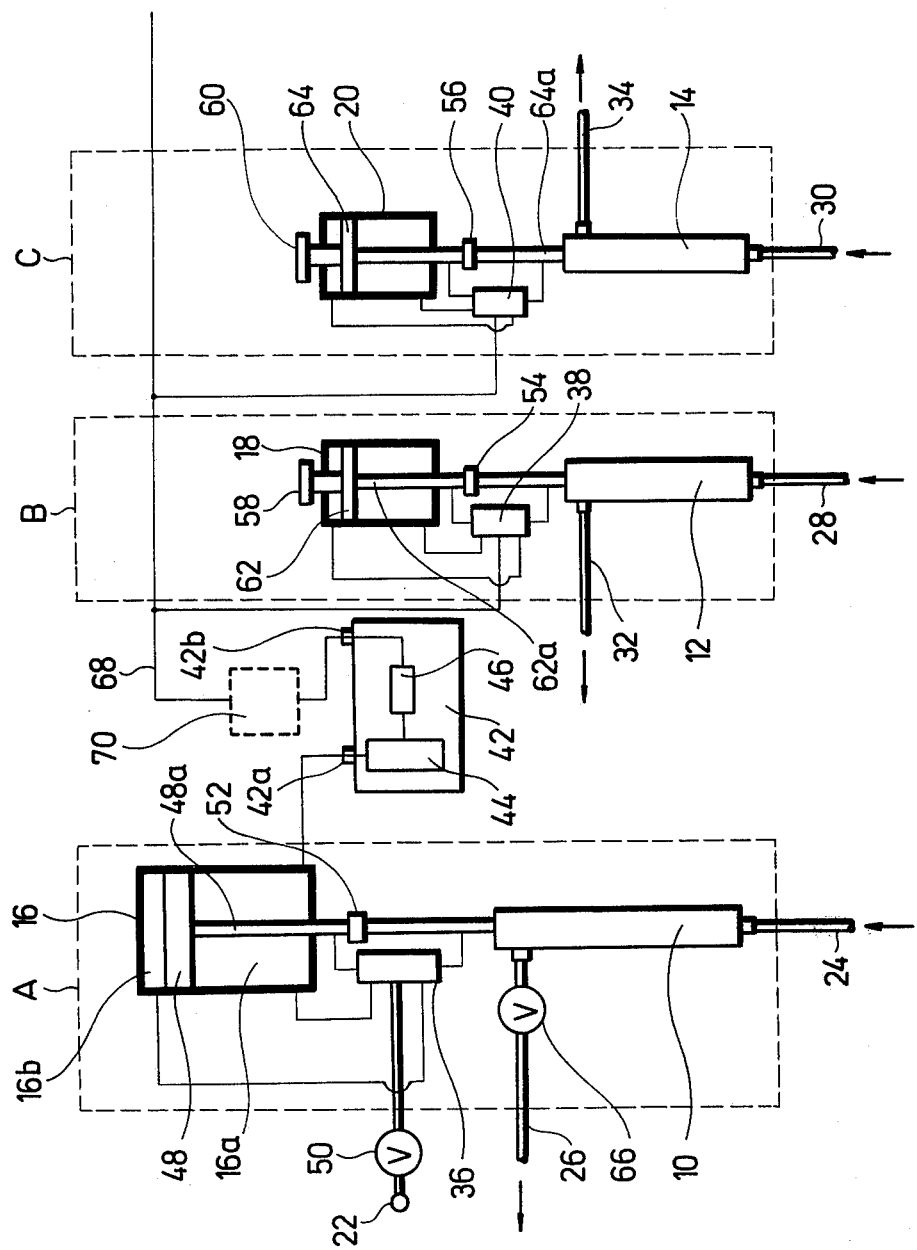
FIG. 1 is a connection diagram of a first exemplified embodiment.

In the drawing, reference character 10 designates a delivery pump for the discharge of synthetic resin. Further delivery pumps 12 and 14 may serve for discharging e.g. a catalyst and an accelerant, respectively. All delivery pumps 10, 12 and 14 of the group are operated by pressure medium drives which consist of pneumatic or hydraulic cylinders. The synthetic resin discharged by delivery pump 10 might prove to be of highest visosity among the substances delivered by the batcher plant. Therefore, the stroke speed of the pressure cylinder which operates the delivery pump 10 will be the lowest in the group so that it is particularly suitable to be selected as a first pressure cylinder 16 which controls the power feeding of the drives of the individual other delivery pumps 12 and 14 because the lower the stroke speed (the slower the piston movements) the higher the accuracy of pressure transmission. The delivery pumps 12 and 14 of the catalyst and the accelerant are operated each by a further pressure cylinder 18 and 20, respectively, which are coupled with the first pressure cylinder 16 through a pressure medium as will be described hereinafter. Delivery pumps and pressure cylinders operating the same form pairwise batcher units A, B, C, of which batcher unit A is responsible, as it were, for controlling the batcher units B and C.

Reference character 22 designates a power source of the plant such as a pipe connection of a pressure medium network.

The delivery pump 10 is provided with a suction pipe 24 for introducing synthetic resin, and with a pressure pipe 26 for delivering the synthetic resin towards the place of its processing. Likewise, the delivery pumps 12 and 14 have suction pipes 28 and 30 and pressure pipes 32 and 34, respectively, connected to them for conveying the catalyst and the accelerant, respectively.

With the represented embodiment shown in FIG. 1, both the first pressure cylinder 16 and the further pressure cylinders 18 and 20 are provided each with a pressure medium reverser 36, 38 and 40, respectively. The further pressure cylinder 18 is, through its pressure medium reverser 38 and a pulse generator unit 42, connected to the first pressure cylinder 16.

The pulse generator unit 42 is arranged for sensing the stroke cycles of the first pressure cylinder 16 and for transmitting pressure signals in dependence thereon. It consists, in the instant case, of a signal transducer 44 and an amplifier 46. With the represented embodiment, the transducer 44 is of the frequency follower type provided with a pneumatic inlet. However, e.g. mechanical or electrical inlets might be employed as well. In the latter case, the operating signal for the transducer 44 could be derived from the movements e.g. of the piston rod 48a of the first pressure cylinder 16 of the batcher unit A and transmitted to the transducer 44. The employment of the pulse generator unit 42 permits to arrange the batcher units A, B, C, etc. at great mutual distances since only signals have to be transmitted without the necessity of overcoming high flow resistances. Thus, it is possible to avoid e.g. an explosion danger which would be inevitable with closely arranged batchers.

With the represented exemplified embodiment the individual pressure medium reversers 38 and 40 of the further pressure cylinders 18 and 20, respectively, are connected to an outlet 42b of the pulse generator unit 42 in parallel connection. The advantage of such arrangement consists in that an optional number of batcher units may be employed with a single pulse generator unit so that considerable investment costs may be saved.

An inlet 42a of the pulse generator unit 42 is connected to a work chamber 16a of the first pressure cylinder 16 in front of its piston 48 while the work chamber 16b behind the piston 48 is connected to the pressure medium reverser 36. However, the arrangement could also be reversed in which case the work chamber 16b behind the piston 48 would be connected with the inlet 42a of the pulse generator unit 42.

The connection line to the pressure medium pipe connection 22 comprises, in the instant case, a throttle valve 50 which serves for controlling the stroke speed and the stroke cycles of the piston 48.

The pressure medium reverser 36 of the first pressure cylinder 16 is controlled, in the instant case, by an abutment 52 fixed to the piston rod 48a of the first pressure cylinder 16 in a manner known per se. Reversal is obtained in a similar manner with the pressure medium reversers 38 and 40 by means of abutments 54 and 56 on the piston rods 62a and 64a of the pistons 62 and 64 of the pressure cylinders 18 and 20, respectively.

Reference characters 58 and 60 designate stroke limiters of the pressure cylinders 18 and 20, respectively, whereby their lengths of stroke can suitably be altered. However, instead of such mechanical control it is possible to shift the abutments 54 and 60 on the piston rods 62a and 64a for altering the length of stroke of the pistons 62 and 64, respectively. Such manner of control is distinguished by a softer response to stroke length variations than with the above mentioned stroke limiters 58 and 60. Shiftable abutments 54 and 56 as well as stroke limiters 58 and 60 constitute second control means for altering the stroke length of the further pressure cylinders 18 and 20, respectively.

Reference character 66 designates a throttle valve in the pressure line 26 of the delivery pump 10 which is likewise suitable to control the operation of the first pressure cylinder 16, the control signals being transmitted through the delivery pump 10 to the pressure cylinder 16. Both throttle valves 50 and 60 form first control means for altering the operation of the first pressure cylinder 16. However, it would also be possible to employ distant control pulses or to provide a pneumatic or hydraulic time relay in the first pressure cylinder 16 for modifying its operation.

In operation, the pressure prevailing in the not represented pressure medium network is permitted to flow from the pipe connection 22 into the pressure medium reverser 36 and from there before or behind the piston 48 of the first pressure cylinder 16 in the batcher unit A. The piston 48 proceed e.g. downwards as regards the drawing until the abutment 52 reverses the pressure medium reverser 36 in a manner known per se and causes the pressure medium to flow into the work chamber 16a in front of piston 48. Then, the piston 48 is shifted upwards until the abutment 52 again causes a reversal of the pressure medium reverser 36.

The piston rod 48a operates the delivery pump 10 by which now synthetic resin is forwarded through the suction pipe 24 into the pressure pipe 26.

The pressure prevailing in the work chamber 16a before the piston 48 affects the transducer 44 the amplified signal of which is transmitted through the pressure medium line 68 to the pressure medium reversers 38 and 40 of the batcher units B and C, respectively, etc.

The pressure medium reversers 38 and 40 of the batcher units B and C cause now the pistons 62 and 64 of the further cylinders 18 and 20 to perform alternate strokes while the delivery pumps 12 and 14 discharge well defined amounts of catalysts and accelerants from their suction pipes 28 and 30 into their pressure pipes 32 and 34, respectively.

The material flow through the various delivery pumps 10, 12 and 14 is indicated by arrows.

It will be apparent that the total amount of discharged material is determined by the speed and the number of cycles of the movements of the piston 48 of the first pressure cylinder 16 since with a given length of stroke it is obviously the speed and the number of cycles of the piston movements which define the rate of delivery. Due to the pneumatic or hydraulic coupling of the further pressure cylinders also the speed and the number of cycles of the latter is defined thereby. Such frequency interdependency of the batcher drives (the pressure cylinders) is the main significance of the invention.

If the total amount of delivery has to be changed, the speed and/or the number of cycles of piston movements in the first pressure cylinder 16 will be modified for which purpose the throttle valve 50 and/or the throttle valve 66 may be adjusted.

On the other hand, mutual proportions of the various delivered substances and more particularly, in the instant case, the mutual proportions of synthetic resin, catalysts and accelerants will be varied by changing the lengths of strokes of the various individual further cylinders 18 and 20 by adjusting the stroke limiters 58 and 60 or by adjusting the abutments 54 and 56 on the piston rods 62a and 64b, respectively, etc. Then, greater or smaller amounts will be discharged by the individual delivery pumps 12 and 14 etc. while the speed of the piston or the number of cycles of its movements are maintained as defined by the first pressure cylinder 16 through the frequency interdependence of all pressure cylinders 16, 18, 20 etc.

With the represented exemplified embodiment, a frequency transducer 70 is provided between the first pressure cylinder 16 and the further pressure cylinders 18 and 20 as indicated by broken lines in FIG. 1. The employment of such frequency transducer permits an adaptation of the individual batcher units within wide limits as regards discharge amounts and proportions of constituents.

Figure 2:
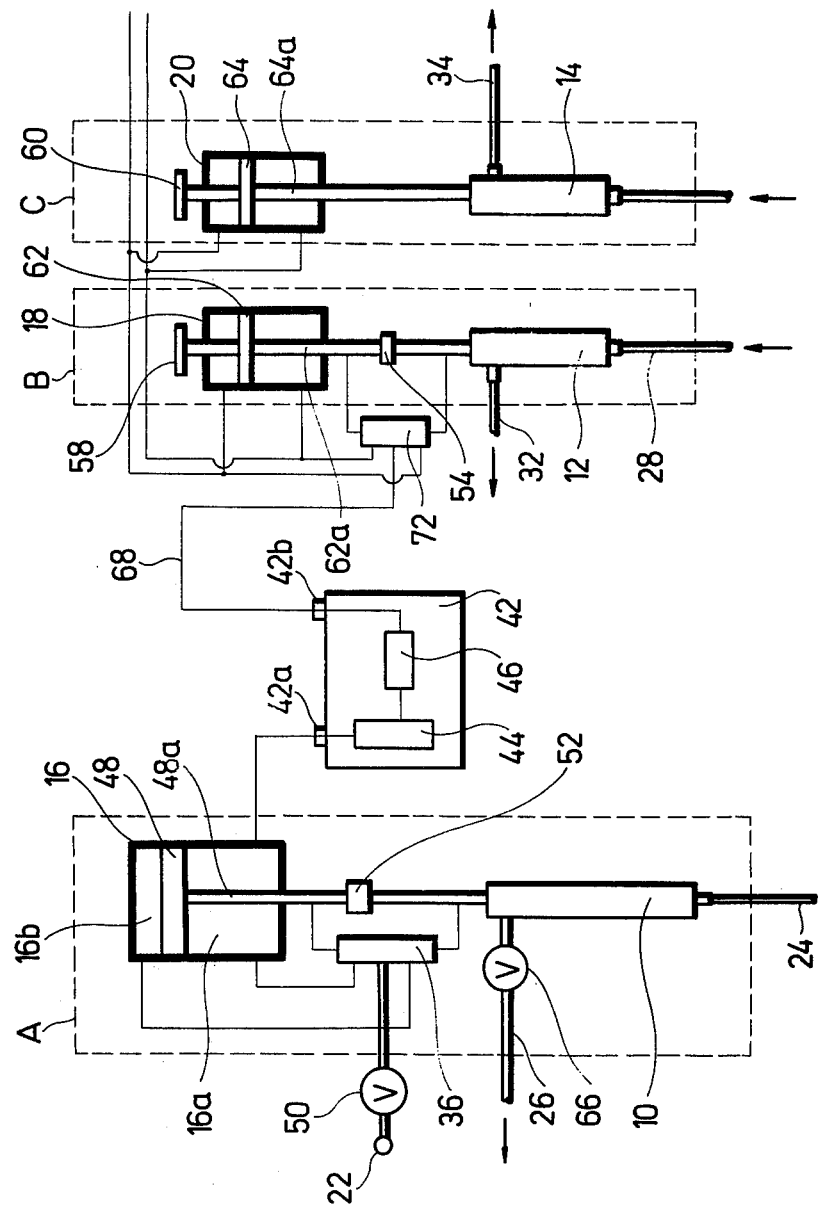
FIG. 2 shows a connection diagram of another exemplified embodiment.

FIG. 2 shows an exemplified embodiment with which the further pressure cylinders 18 and 20 are, in contrast to the above described case, connected in parallel to a common pressure medium reverser 72. The pressure medium reverser 72 is then connected with the outlet 42b of the pulse generator unit 42 in the already described manner.

Such arrangement will preferably be used where the batcher units B and C, etc. are closely arranged while the batcher unit A performing the task of control is located in a distance from the others, so that the length of the connection lines between the batcher units B and C are insignificant with respect to the length of the connection line to the batcher unit A. Thus, a number of component parts may be dispensed with.

Operation and control of the exemplified embodiment according to FIG. 2 are essentially the same as in case of the exemplified embodiment shown in FIG. 1.

Figure 3:
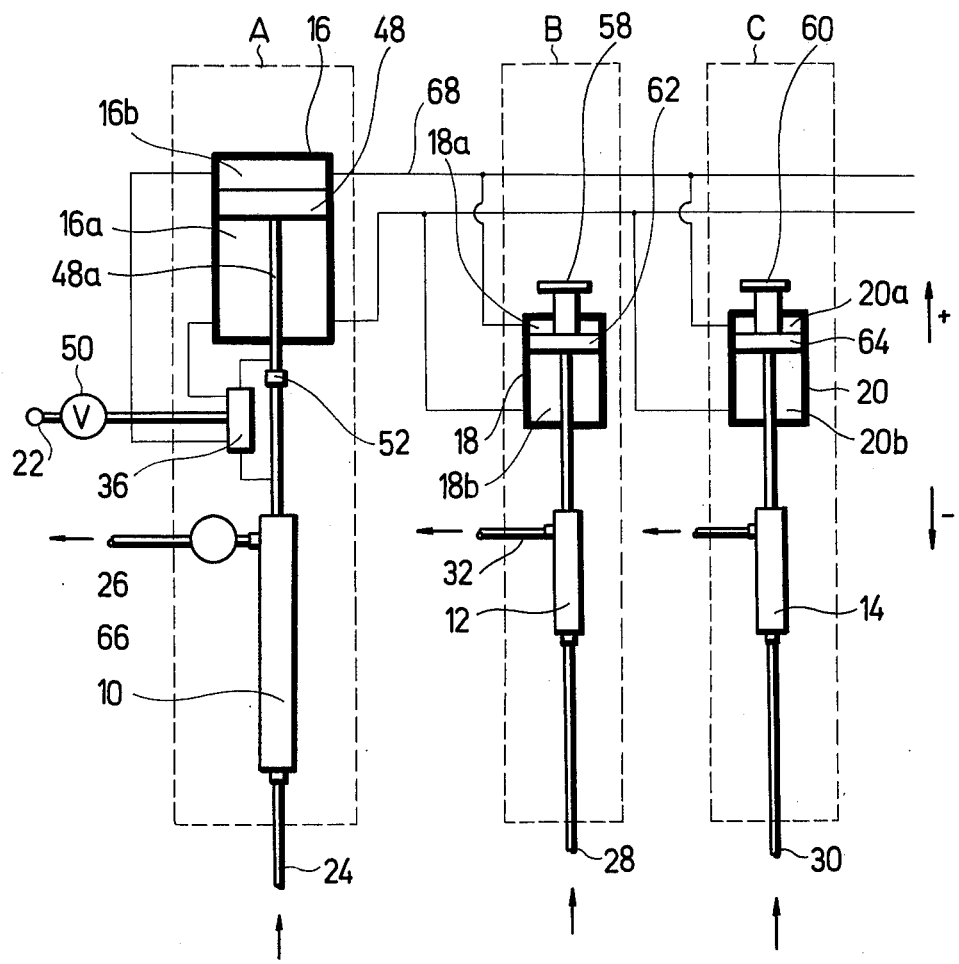
FIG. 3 represents a connection diagram of a third exemplified embodiment.

FIG. 3 shows, by way of example, an embodiment of the invention with double-acting further pressure cylinders 18 and 20 which are connected by means of their work chambers 18a, 18b and 20a, 20b directly to the work chambers 16a and 16b, respectively, of the first pressure cylinder 16. Such embodiment is distinguished by high operational reliability, smooth running, simple design and reasonable costs.

The operation of this embodiment differs from the previous ones only in that in absence of pressure medium reversers of further pressure cylinders 18 and 20 mutual proportions of discharge substances will be modified by means of the stroke limiters 58 and 60, respectively.

Figure 4:
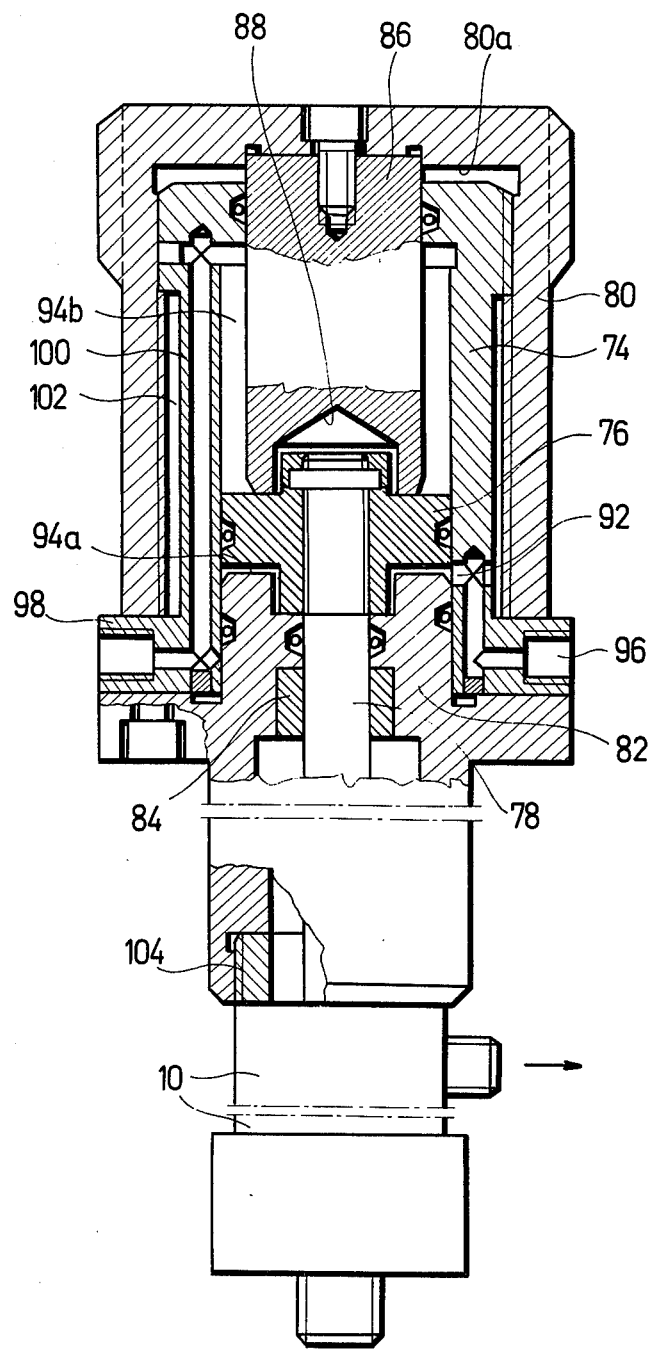
FIG. 4 is a longitudinal sectional view of a preferable embodiment of a pressure cylinder of the batcher plant according to the invention.

FIG. 4 represents a longitudinal sectional view of a preferable exemplified embodiment of a further pressure cylinder. In a cylinder barrel 74 a piston 76 with a piston rod 78 is arranged for gliding movements in axial direction. The cylinder barrel 74 is, behind the piston 76, closed by an upper cylinder head 80 which is constituted by a sleeve closed at its upper extremity and provided with internal threads. Before the piston 76 the cylinder barrel 74 is closed by a lower cylinder head 82 with a guide sleeve 84 which surrounds the piston rod 78. The cylinder barrel 74 is provided at its upper extremity with external threads which engage the internal threads of the upper cylinder head 80. The internal bottom surface 80a of the bell shaped upper cylinder head 80 has a cylindrical abutment lug 86 fixed to it provided with a hole 88 for receiving the top portion of the piston 76. Bore 90 in the wall of the cylinder barrel 74 opens through radial passages 92 in work chambers 94a and 94b, respectively, before and behind the piston 76. The bores 90 have radial connection bores 96 connected to them which are formed in a fitting brim 98 of the cylinder barrel 74.

With the represented embodiment, the surface of the cylinder barrel 74 is provided with a flat portion 100 which carries a scale 102.

The lower cylinder head 82 is, in the instant case, provided with threads 104 by means of which it may be connected to a delivery pump such as the delivery pump 12 of the catalysts of the former exemplified embodiments.

In operation, the length of stroke of piston 76 may be observed by means of the scale 102 on the flat portion 100 of the cylinder barrel 74. If the length of stroke has to be modified, the upper cylinder head 80 is turned in such a manner that the distance between the abutment lug 86 and more particularly its hole 88 and the upper portion of the piston 76 in increases or decreases dependent on the direction of turning. In this manner a very fine adjustment of the length of stroke of the piston can be obtained in contrast to known mechanical plants which is particularly significant in case of defining the proportions of additions to be discharged in relatively very low amounts.

The described batcher units and pressure cylinders as well as their associated delivery pumps permit to compose a module series the members of which may be selected so as to perform the most various functions and, more particularly, to process synthetic resins. However, the batching of synthetic resin has been described only by way of example. Obviously, the invention permits to batch and to proportion whatever substances if they are suitable for being discharged by devices such as pistons.

EXAMPLE 1

For batching a polyester resin a first pneumatic pressure cylinder of e.g. 60 strokes per minute may be employed. A double-acting delivery pump with a length of stroke of 100 millimeters is operated by the aforesaid first pressure cylinder. The volume per stroke of the pump amounts to 100 cubic centimeters. Alternate movements are ensured by a reverser. The lower work chamber and the upper work chamber of the first pressure cylinder are connected with the lower and upper work chambers, respectively, of two uniform further pressure cylinders having each a length of stroke of 50 millimeters. These further pressure cylinders operate each a double-acting delivery pump with a volume per stroke of 10 cubic centimeters and 5 cubic centimeters, respectively. The lengths of stroke of the further pressure cylinders may be adjusted by threaded abutments behind the piston in a range of 50 millimeters to 5 millimeters. The larger delivery pump serves as an auxiliary pump for delivering a catalyst while the smaller delivery pump serves for delivering an accelerant, both substances being admixed to the synthetic resin discharged by the aforesaid first mentioned pump. The amount of the catalyst and the amount of the accelerant may be adjusted dependent on the length of stroke in a percentage relation of 10 to 0.5 and 5 to 0.25. The synthetic resin, the catalyst and the accelerant are introduced into a mixer in which they are mixed and, subsequently, processed in a conventional manner.

EXAMPLE 2

A first hydraulic pressure cylinder having a length of stroke of 500 millimeters is employed in a machine for preparing epoxide concrete. The first pressure cylinder operates a double-acting resin pump having a volume per stroke of 1000 cubic centimeters. The amount of delivery is adjusted by an electro-hydraulic limit switch. The piston rod of the first pressure cylinder operates a pulse generator which, in certain limit positions of the piston of the first pressure cylinder, transmits signals to the further pressure cylinders discharging the additions and operates them at a number of cycles which is dependent on the number of cycles of the first pressure cylinder. Four further pressure cylinders are employed. One of them serves for operating a delivery pump discharging a hardener, an amount of 10 to 25% being discharged. The three other further pressure cylinders operate each a batcher for sands of various grain sizes, the amounts being adjustable between 500 to 600%. The percentage adjustment of the individual components is effected by hydraulic reversers on the pressure cylinders. The discharged materials are introduced in concrete mixers known per se and are processed in a conventional manner.

With the method according to the invention, the exact proportions of the individual components may deviate from the required value within one stroke of the first pressure cylinder. This is, however, of no consequence since the absolute amounts to be discharged are practically by orders of magnitude greater than the amounts discharged during a single stroke. However, if it is required that the proportions should be uniform in dependence on time the system may be provided with one or more compensation vessels.

If substances of preselected and calculable material requirements are repeatedly used as is the case e.g. with the series manufacturing of synthetic resin products, the absolute amount to be delivered and preselected is adjusted simply by pneumatically counting the number of strokes or measuring the operational time of any pressure cylinder of the plant and stopping the system automatically when a preselected number of strokes or a preselected operational time period is reached. The first pressure cylinder will preferably be used for such purpose. As will be apparent, a particular advantage of the batcher plant according to the invention consists in that it permits to operate a practically unlimited number of batcher units at synchronous cycles of piston strokes and to arrange such units at optional places and in considerable distances from one another. Advantageous results have been obtained by experiments in which the batcher plant according to the invention was adapted to spray guns of various designs for the manufacture of synthetic resin products with glass fibre structures.

What we claim is:

1. In a method of batching at least two substances, more particularly synthetic resins and other materials such as catalysts and accelerants in preselected and adjustable amounts and proportions, each substance being delivered by individual batchers, the steps of driving said batchers by means of reciprocating pressure cylinders, selecting a first pressure cylinder for being supplied with a pressure medium from a source of such medium, feeding further pressure cylinders with a pressure medium dependent on the number of strokes per minute of said first pressure cylinder, controlling the total amount of discharge of the batchers by varying the number of strokes per minute of said first pressure cylinder, and controlling the mutual proportions of delivered substances by varying the stroke lengths of said further pressure cylinders.

2. In a plant for batching at least two substances, more particularly synthetic resins and other materials such as catalysts and accelerants in preselected and adjustable amounts and proportions, each substance being delivered by individual batchers, a first reciprocable pressure cylinder and at least one further reciprocable pressure cylinder arranged for driving said batchers, a pressure medium reverser associated with and arranged upstream of said first pressure cylinder, at least one work chamber of said further pressure cylinder being in operational connection with one of the work chambers of said first pressure cylinder, first control means for altering the number of strokes per minute of said first pressure cylinder, and second control means for altering the stroke length of said further pressure cylinder.

3. In a plant as claimed in claim 2 the provision of a pressure medium reverser associated with and arranged upstream of said further pressure cylinder, and a pulse generator between said first pressure cylinder and said pressure medium reverser of said further pressure cylinder, said pulse generator being arranged for delivering pressure signals to the pressure medium reverser of said further pressure cylinder.

4. In a plant as claimed in claim 3 and comprising more than one further reciprocable pressure cylinder each provided with a pressure medium reverser the further improvement of connecting the pressure medium reversers of said further pressure cylinders to an outlet of said pulse generator in parallel connection.

5. In a plant as claimed in claim 3 and comprising more than one further reciprocable pressure cylinder the further improvement of the provision of a common pressure medium reverser for all further pressure cylinders, said further pressure cylinders being connected to said common pressure medium reverser in parallel connection.

6. In a plant as claimed in claim 2 the still further improvement of the provision of a frequency transducer in the operational connection between said first pressure cylinder and said further pressure cylinder.

7. In a plant as claimed in claim 2, the further improvement of the provision of double-acting further pressure cylinders, the work chambers of said double-acting pressure cylinders being connected directly to the work chambers of said first pressure cylinder.

8. In a plant as claimed in claim 2 and comprising a pressure medium cylinder barrel, a piston arranged for alternate movements in said cylinder barrel, and cylinder heads closing said cylinder barrel, the still further improvement of the cylinder head behind said piston consisting in a sleeve closed at one extremity and provided with internal threads arranged for engagement with external threads on said cylinder barrel so as to permit an adjustment of the stroke of said piston.

* * * * *